United States Patent
Kimura et al.

(10) Patent No.: US 7,120,102 B2
(45) Date of Patent: Oct. 10, 2006

(54) JITTER DETECTION APPARATUS AND JITTER DETECTION METHOD

(75) Inventors: Naohiro Kimura, Kyoto (JP); Harumitsu Miyashita, Nara (JP); Takeshi Nakajima, Nara (JP); Tetsuya Shihara, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 602 days.

(21) Appl. No.: 10/675,384

(22) Filed: Sep. 30, 2003

(65) Prior Publication Data

US 2004/0081051 A1   Apr. 29, 2004

(30) Foreign Application Priority Data

Oct. 24, 2002   (JP)   ............................. 2002-309335

(51) Int. Cl.
*G11B 7/00*   (2006.01)
(52) U.S. Cl. .................................... 369/53.34
(58) Field of Classification Search ............. 369/53.32, 369/53.33, 53.34, 53.35
See application file for complete search history.

(56) References Cited

U.S. PATENT DOCUMENTS 6,828,865 B1 *  12/2004  Yamane et al. ............... 331/25

FOREIGN PATENT DOCUMENTS

| JP | 2002-015523 | 1/2002 |
| JP | 2002-107394 | 4/2002 |

* cited by examiner

*Primary Examiner*—Nabil Hindi
(74) *Attorney, Agent, or Firm*—Renner, Otto, Boisselle & Sklar, LLP (57) ABSTRACT

A jitter detection apparatus includes an A/D conversion section for converting an input analog signal into a plurality of discrete multiple value digital signals; a binarization section for performing binarization of the plurality of multiple value digital signals to generate a binary signal; a jitter calculation section for calculating a jitter amount based on an error between a value of a prescribed multiple value digital signal sampled at a time which is substantially the same as a time when the value of the binary signal is changed and a prescribed threshold value; a pattern detection section for detecting patterns of the binary signal before and after the time when the prescribed multiple value digital signal is sampled; and a correction section for correcting the jitter amount based on the detected pattern.

14 Claims, 6 Drawing Sheets

JITTER DETECTION APPARATUS AND JITTER DETECTION METHOD

BACKGROUND OF THE INVENTION

1. Field of the Invention

The present invention relates to a jitter detection apparatus and a jitter detection method used for reproducing information recorded on an optical disc or the like.

2. Description of the Related Art

As digital signal processing technologies progress, binary information recorded on an information recording medium such as, for example, an optical disc is reproduced using a binarization digital read channel technology. According to the binarization digital read channel technology, binarization is performed after a reproduction waveform is converted into digital data. Since the digital read channel technology uses digital data which is sampled on a time series, jitter, which is an index representing the signal quality, cannot be directly obtained. When the digital read channel technology is used, jitter detection methods described in, for example, Japanese Laid-Open Publication Nos. 2002-107394 and 2002-15523 are used. By the method described in Japanese Laid-Open Publication No. 2002-107394 (paragraph 0016 and FIG. 6), the jitter is obtained by normalizing the digital data sampled at a zero-cross point using digital data immediately before or immediately after the zero-cross point. By the method described in Japanese Laid-Open Publication No. 2002-15523 (paragraphs 0017 to 0020 and FIG. 11), the jitter is obtained by performing linear interpolation using digital data before and after the zero-cross point.

Recently, in order to further increase the recording capacity of information recording mediums, the adaptation of a new modulation system is considered instead of the conventional modulation system. Whereas the conventional modulation system sets the minimum run-length as 3 clock cycles (for example, an EFM modulation system used for CDs or an 8–16 modulation system used for DVDs), the new modulation system sets the minimum run-length as 2 clock cycles. As the run-length is shorter, the recording density is increased, but the influence of inter-symbol interference is also increased. Due to such an influence of inter-symbol interference, it has become impossible to obtain correct jitter using the conventional jitter detection method when data sampled at a sampling frequency at or close to channel rate is reproduced. The reason is that the influence of inter-symbol interference is too large for linear interpolation to be used for calculating the jitter.

SUMMARY OF THE INVENTION

According to one aspect of the invention, a jitter detection apparatus includes an A/D conversion section for converting an input analog signal into a plurality of discrete multiple value digital signals; a binarization section for performing binarization of the plurality of multiple value digital signals to generate a binary signal; a jitter calculation section for calculating a jitter amount based on an error between a value of a prescribed multiple value digital signal sampled at a time which is substantially the same as a time when the value of the binary signal is changed and a prescribed threshold value; a pattern detection section for detecting patterns of the binary signal before and after the time when the prescribed multiple value digital signal is sampled; and a correction section for correcting the jitter amount based on the detected pattern.

In one embodiment of the invention, the correction section corrects the jitter amount when the detected pattern includes a shortest pattern.

In one embodiment of the invention, the input analog signal is modulated based on a run-length limited code having a shortest run-length of 2 clock cycles. The length of the shortest pattern is a length of 2 clock cycles.

According to another aspect of the invention, a jitter detection apparatus includes an A/D conversion section for converting an input analog signal into a plurality of discrete multiple value digital signals; a binarization section for performing binarization of the plurality of multiple value digital signals to generate a binary signal; a jitter calculation section for calculating a jitter amount based on an error between a value of a prescribed multiple value digital signal sampled at a time which is substantially the same as a time when the value of the binary signal is changed and a prescribed threshold value; a pattern detection section for detecting patterns of the binary signal before and after the time when the prescribed multiple value digital signal is sampled; an amplitude detection section for detecting an amplitude of the prescribed multiple value digital signal based on at least one of a plurality of multiple value digital signals sampled before and after the time when the prescribed multiple value digital signal is sampled; and a correction section for correcting the jitter amount based on the detected pattern and the detected amplitude.

In one embodiment of the invention, the amplitude detection section detects an amplitude of a range of the input analog signal having a shortest pattern, based on at least one of the sampled plurality of multiple value digital signals.

In one embodiment of the invention, the amplitude detection section further detects an amplitude of a range of the input analog signal having a pattern other than the shortest pattern.

In one embodiment of the invention, the correction section corrects the jitter amount when the detected pattern includes a shortest pattern.

In one embodiment of the invention, the input analog signal is modulated based on a run-length limited code having a shortest run-length of 2 clock cycles. The length of the shortest pattern is a length of 2 clock cycles.

According to still another aspect of the invention, a jitter detection apparatus includes an A/D conversion section for converting an input analog signal into a plurality of discrete multiple value digital signals; a binarization section for performing binarization of the plurality of multiple value digital signals to generate a binary signal; a pattern detection section for detecting patterns of the binary signal before and after a time when the value of the binary signal is changed; and a jitter calculation section for calculating a jitter amount based on the detected pattern and an error between a prescribed threshold value and a value of a prescribed multiple value digital signal sampled at a time which is substantially the same as the time when the value of the binary signal is changed.

In one embodiment of the invention, the jitter calculation section calculates the jitter amount based on a pattern which is longer among the pattern of the binary signal before the time when the prescribed multiple value digital signal is sampled and the pattern of the binary signal after the time when the prescribed multiple value digital signal is sampled.

In one embodiment of the invention, the input analog signal is modulated based on a run-length limited code having a shortest run-length of 2 clock cycles.

According to still another aspect of the invention, a jitter detection method includes the steps of converting an input analog signal into a plurality of discrete multiple value digital signals; performing binarization of the plurality of multiple value digital signals to generate a binary signal; calculating a jitter amount based on an error between a value of a prescribed multiple value digital signal sampled at a time which is substantially the same as a time when the value of the binary signal is changed and a prescribed threshold value; detecting patterns of the binary signal before and after the time when the prescribed multiple value digital signal is sampled; and correcting the jitter amount based on the detected pattern.

According to still another aspect of the invention, a jitter detection method includes the steps of converting an input analog signal into a plurality of discrete multiple value digital signals; performing binarization of the plurality of multiple value digital signals to generate a binary signal; calculating a jitter amount based on an error between a value of a prescribed multiple value digital signal sampled at a time which is substantially the same as a time when the value of the binary signal is changed and a prescribed threshold value; detecting patterns of the binary signal before and after the time when the prescribed multiple value digital signal is sampled; detecting an amplitude of the prescribed multiple value digital signal based on at least one of a plurality of multiple value digital signals sampled before and after the time when the prescribed multiple value digital signal is sampled; and correcting the jitter amount based on the detected pattern and the detected amplitude.

According to still another aspect of the invention, a jitter detection method includes the steps of converting an input analog signal into a plurality of discrete multiple value digital signals; performing binarization of the plurality of multiple value digital signals to generate a binary signal; detecting patterns of the binary signal before and after a time when the value of the binary signal is changed; and calculating a jitter amount based on the detected pattern and an error between a prescribed threshold value and a value of a prescribed multiple value digital signal sampled at a time which is substantially the same as the time when the value of the binary signal is changed.

Thus, the invention described herein makes possible the advantages of providing a jitter detection apparatus and a jitter detection method for detecting jitter even when an inter-symbol influence is large.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
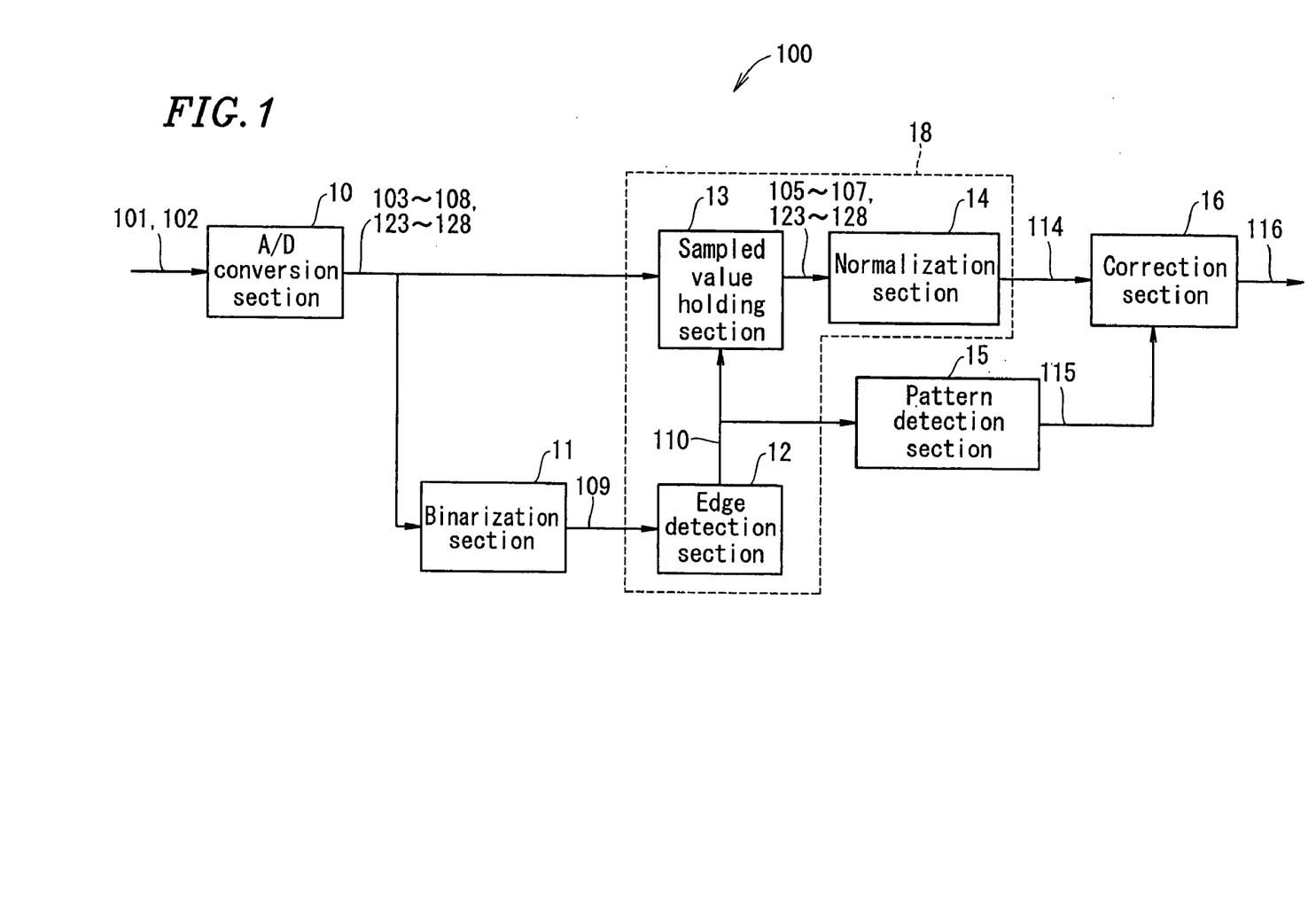
FIG. 1 is a block diagram of a jitter detection apparatus according to a first example of the present invention.

FIG. 1 is a block diagram illustrating a jitter detection apparatus 100 according to a first example of the present invention.

The jitter detection apparatus 100 includes an A/D conversion section 10 for converting an input analog signal into a plurality of discrete multiple value digital signals, a binarization section 11 for performing binarization of the plurality of discrete multiple value digital signals to generate a binary signal, a jitter calculation section 18 for calculating jitter based on an error between (i) a value of a prescribed multiple value digital signal which has been sampled at a time which is substantially the same as a time when the value of the binary signal is changed and (ii) a prescribed threshold value, a pattern detection section 15 for detecting patterns of the binary signal before and after the time when the prescribed multiple value digital signal was sampled, and a correction section 16 for correcting a jitter amount based on the detected pattern. The jitter calculation section 18 includes an edge detection section 12, a sample value holding section 13 and a normalization section 14.

Figure 3:
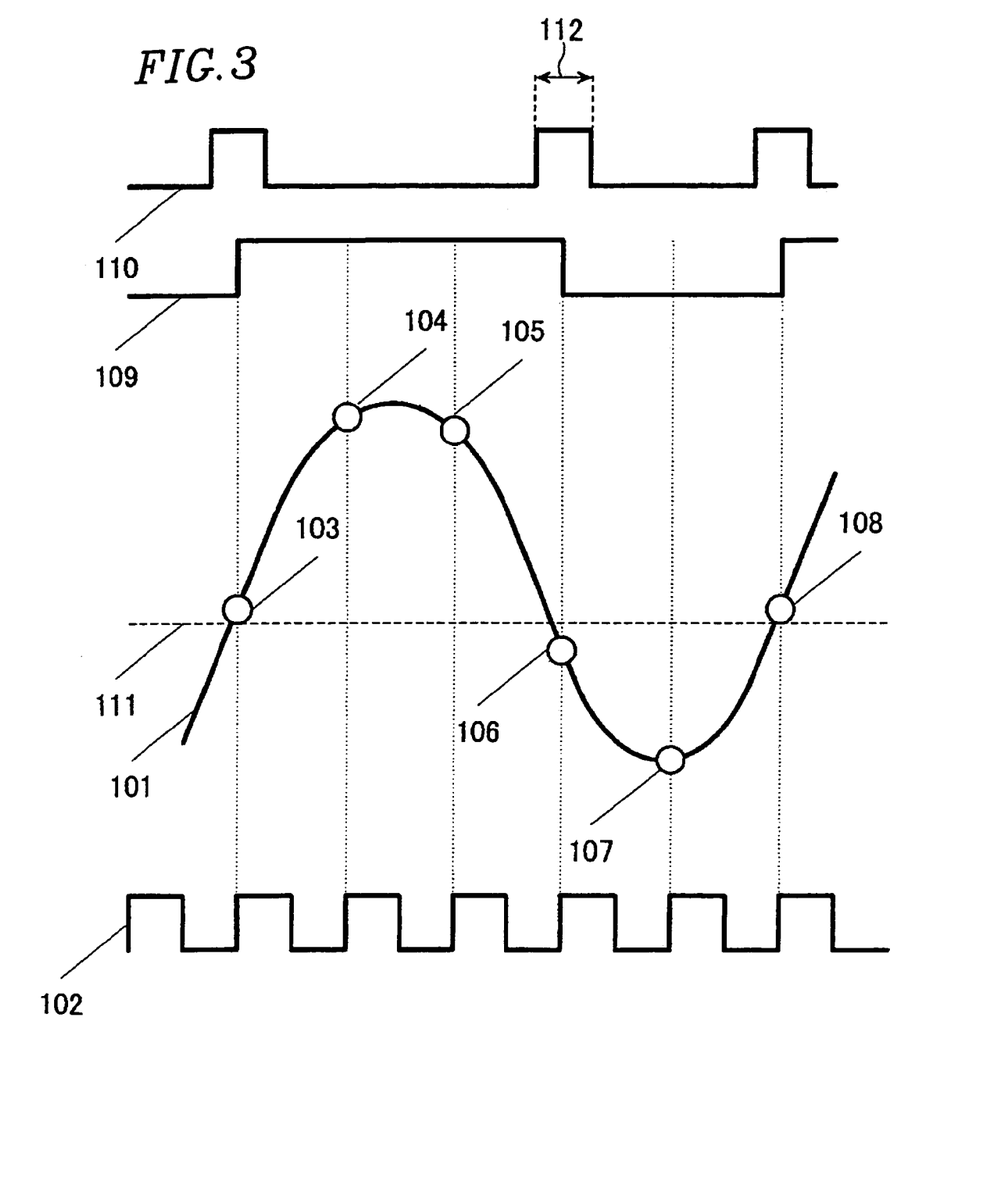
FIG. 3 is a timing diagram illustrating the relationship between signals transferred in the jitter detection apparatus described in the first through fourth examples of the present invention.

FIG. 3 is a timing diagram illustrating the relationship among signals transferred in, for example, the jitter detection apparatus 100.

The A/D conversion section 10 receives an analog signal 101 and a sampling clock signal 102 phase-synchronized to the analog signal 101 from an optical head section, a PLL (phase-locked loop) or the like (not shown). The analog signal 101 has been modulated based on a run-length limited code by which the minimum run-length is 2 clock cycles. Thus, the length of the minimum pattern of a binary signal obtained based on the analog signal 101 is 2 clock cycles. The A/D conversion section 10 converts the analog signal 101 into a plurality of discrete multiple value digital signals 103, 104, 105, 106, 107 and 108 based on a prescribed threshold value 111 at every clock cycle of the sampling clock signal 102. Then, the A/D conversion section 10 outputs the multiple value digital signals 103 through 108 to the binarization section 11 and the sampled value holding section 13. The multiple value digital signals 103 through 108 represent, for example, 8-bit data. The prescribed threshold value 111 is, for example, a zero level, but may be set at any value.

The binarization section 11 performs binarization of the multiple value digital signals 103 through 108 received from the A/D conversion section 10 to generate a binary signal 109. The binarization section 11 then outputs the binary signal 109 to the edge detection section 12. As the binarization method, any conventional method is usable. For example, the binarization is performed based on the polarity of the sum of the values of the continuous digital signals. In this specification, the term "polarity" relates to the level of the signal or the like relative to the prescribed threshold level.

The edge detection section 12 detects a time at which the value of the binary signal 109 is changed, and generates an edge signal 110 which becomes HIGH at the time when the value of the binary signal 109 is changed. The time when the value of the binary signal 109 is changed matches the time when the value of the sampling clock signal 102 is changed. The edge detection section 12 outputs the edge signal 110 to the sampled value holding section 13 and the pattern detection section 15.

The sampled value holding section 13 holds a prescribed multiple value digital signal which has been sampled at a zero-cross point and multiple value digital signals immediately before and immediately after the zero-cross point, and outputs these digital signals to the normalization section 14. For example, the sampled value holding section 13 holds the multiple value digital signal 106 sampled at the zero-cross point corresponding to a HIGH level period 112, the multiple value digital signal 105 immediately before the zero-cross point, and the multiple value digital signal 107 immediately after the zero-cross point. The sampled value holding section 13 outputs the multiple value digital signals 105 through 107 to the normalization section 14. In this example, the zero-cross point is substantially equal to a time when the value of the sampling clock signal 102 is changed. The zero-cross point is also substantially equal to a time when the value of the binary signal 109 is changed. When the analog signal 101 includes jitter as shown in FIG. 3, the value represented by the prescribed multiple value digital signal sampled at the zero-cross point, i.e., the multiple value digital signals 103, 106 and 108 is not zero.

The normalization section 14 divides the absolute value of the prescribed multiple value digital signal at the zero-cross point (i.e., the error between the prescribed multiple value digital signal and the threshold value 111) by the sum of the absolute value of the multiple value digital signal immediately before the zero-cross point and the absolute value of the multiple value digital signal immediately after the zero-cross point. Thus, the normalization section 14 generates normalized jitter data 114 which represents the jitter (i.e., a phase shift amount of the analog signal 101 with respect to the clock). Then, the normalization section 14 outputs the normalized jitter data 114 to the correction section 16. For example, the normalized jitter data 114 corresponding to the HIGH level period 112 represents a value obtained by dividing the absolute value of the multiple value digital signal 106 at the zero-cross point by the sum of the absolute value of the multiple value digital signal 105 immediately before the zero-cross point and the absolute value of the multiple value digital signal 107 immediately after the zero-cross point.

The pattern detection section 15 detects an interval between the time when the edge signal 110 becomes HIGH and the immediately previous time when the edge signal 110 becomes HIGH and the immediately subsequent time when edge signal 110 becomes HIGH, on a cycle-by-cycle basis of the sampling clock signal 102. The pattern detection section 15 then outputs pattern information 115 representing the intervals to the correction section 16. The pattern information 115 represents, for example, an interval 3T between the multiple value digital signal 103 and the multiple value digital signal 106 and an interval 2T between the multiple value digital signal 106 and the multiple value digital signal 108. Here, T represents a cycle of the sampling clock signal 102.

The correction section 16 performs a calculation predetermined in accordance with the pattern information 115 on the normalized jitter data 114 to correct the jitter amount, and outputs corrected jitter data 116 representing the corrected jitter amount.

Figure 4A:
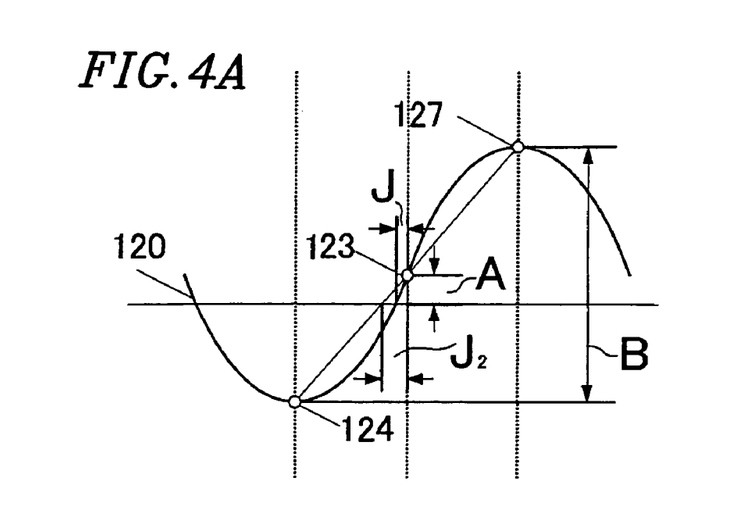
FIG. 4A is a diagram illustrating a waveform of a 2T pattern analog signal.
Figure 4B:
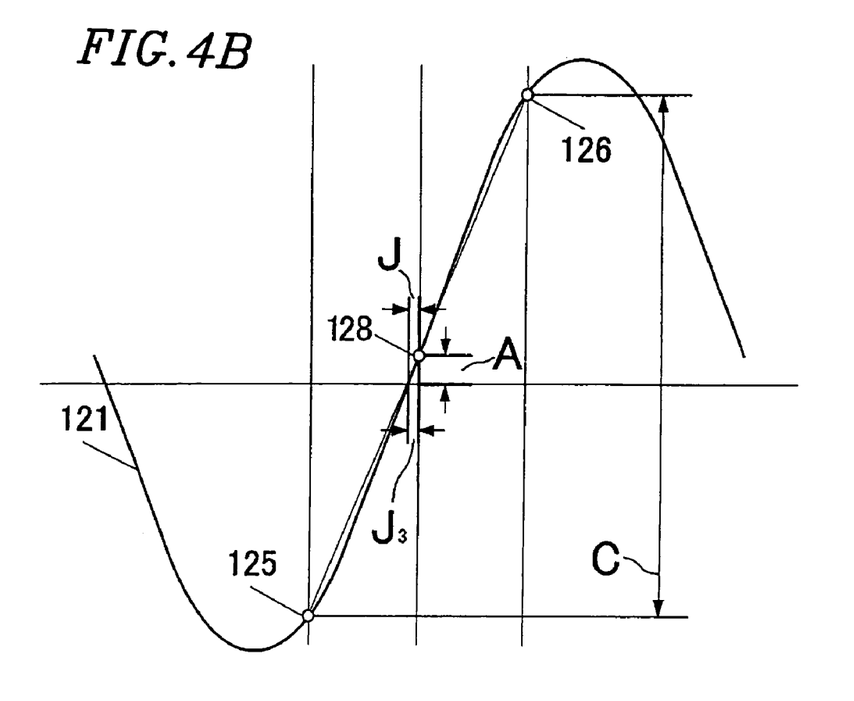
FIG. 4B is a diagram illustrating a waveform of a 3T pattern analog signal.
Figure 5:
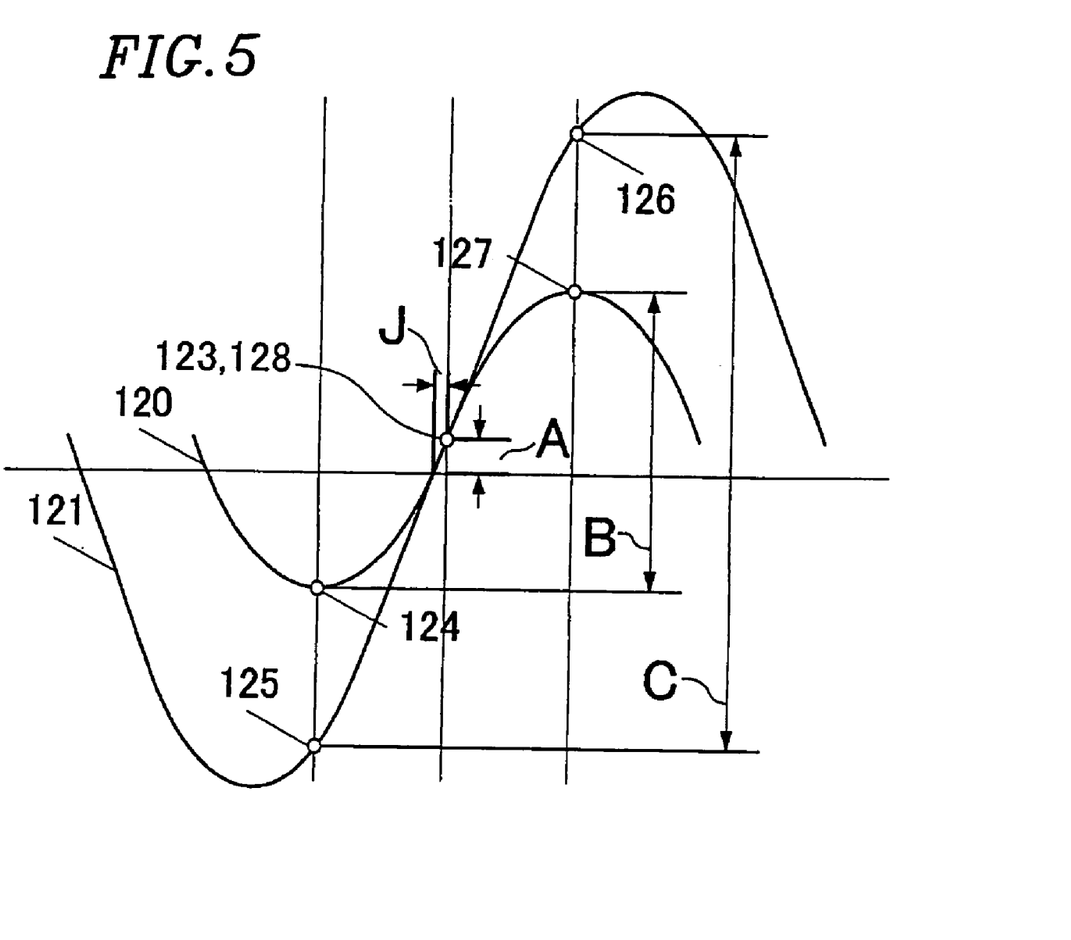
FIG. 5 is a diagram illustrating overlapping waveforms of the 2T pattern analog signal and the 3T pattern analog signal.

With reference to FIGS. 4A, 4B and 5, a correction amount of the jitter will be described. FIG. 4A shows a waveform of an analog signal 120 of a 2T pattern, of which a half-cycle is 2T. FIG. 4B shows a waveform of an analog signal 121 of a 3T pattern, of which a half-cycle is 3T. The analog signals 120 and 121 are each a part of the analog signal 101 (FIG. 1). FIG. 5 shows a waveform obtained by overlapping the analog signals 120 and 121.

The analog signals 120 and 121 have an equal jitter amount J. A multiple value digital signal 123 and a multiple value digital signal 128 which are sampled at the zero-cross point both have an absolute value of A.

When the 3T analog signal 121 is subjected to A/D conversion, the multiple value digital signal 128 sampled at the zero-cross point and multiple value digital signals 125 and 126 sampled at the times before and after the zero-cross point are obtained. The normalized jitter amount $J_3$ is obtained by expression (1).

$$J_3 = A/C \qquad \text{expression (1)}$$

Here, C is the sum of the absolute values of the multiple value digital signals 125 and 126. As shown in FIG. 4B, the normalized jitter amount $J_3$ is approximately equal to the true jitter amount J. Thus, it is found that a correct jitter amount has been obtained.

When the 2T analog signal 120 is subjected to A/D conversion, the multiple value digital signal 123 sampled at the zero-cross point and multiple value digital signals 124 and 127 sampled at the times before and after the zero-cross point are obtained. The normalized jitter amount $J_2$ is obtained by expression (2).

$$J_2 = A/B \qquad \text{expression (2)}$$

Here, B is the sum of the absolute values of the multiple value digital signals 124 and 127. As shown in FIG. 4A, the normalized jitter amount $J_2$ is significantly different from the true jitter amount J.

The reason is as follows. The waveform of the analog signal 121 between the multiple value digital signals 125 and 126 (FIG. 4B) is approximately linear, and thus a jitter amount can be obtained by linear interpolation. By contrast, the waveform of the analog signal 120 between the multiple value digital signals 124 and 127 (FIG. 4A) is not linear, and thus a correct jitter amount cannot be obtained by linear interpolation.

In order to obtain a correct jitter amount by linear interpolation from the 2T pattern analog signal 120, it is necessary to correct the multiple value digital signals 124 and 127 before and after the zero-cross point such that the signals 124 and 127 have the amplitudes matching those of the multiple value digital signals 125 and 126. As shown in, for example, FIG. 5, the amplitude of the 3T pattern analog signal 121 is about twice as large as that of the 2T pattern analog signal 120. A correct jitter amount is obtained by multiplying the normalized jitter amount $J_2$ by a predetermined correction value in accordance with the signal pattern before and after the zero-cross point.

Where the absolute value of a multiple value digital signal immediately before the zero-cross point is E, the absolute value of a multiple value digital signal immediately after the zero-cross point is F, and the correction value is $\alpha$, the normalized jitter data $J_N$ is obtained based on expression (3). A corrected jitter amount H is obtained based on expression (4). The calculation of expression (3) is performed by the normalization section 14, and the calculation of expression (4) is performed by the correction section 16.

$$J_N = A/(E+F) \quad \text{expression (3)}$$

$$H = J_N \times \alpha \quad \text{expression (4)}$$

The correction value α is determined in accordance with the pattern (run-length) of the binary signal 109 immediately before and immediately after the zero-cross point as follows.

When the pattern of the signals on both sides of the zero-cross point is 2T: α=0.5

When the pattern of the signal on only one of both sides of the zero-cross point is 2T: α=0.75

When the pattern of the signals on both sides of the zero-cross point is 3T or larger: α=1.0

For example, in the case of the analog signal 120 shown in FIG. 4A ($J_N = J_2$), the pattern of the signals on both sides of the zero-cross point is 2T. Thus, the correction value of α=0.5.

By predetermining the correction value α in accordance with the pattern of the analog signal 101 specified from the binary signal 109, correct jitter measurement can be performed even when the inter-symbol interference is excessively large.

EXAMPLE 2

Figure 2:
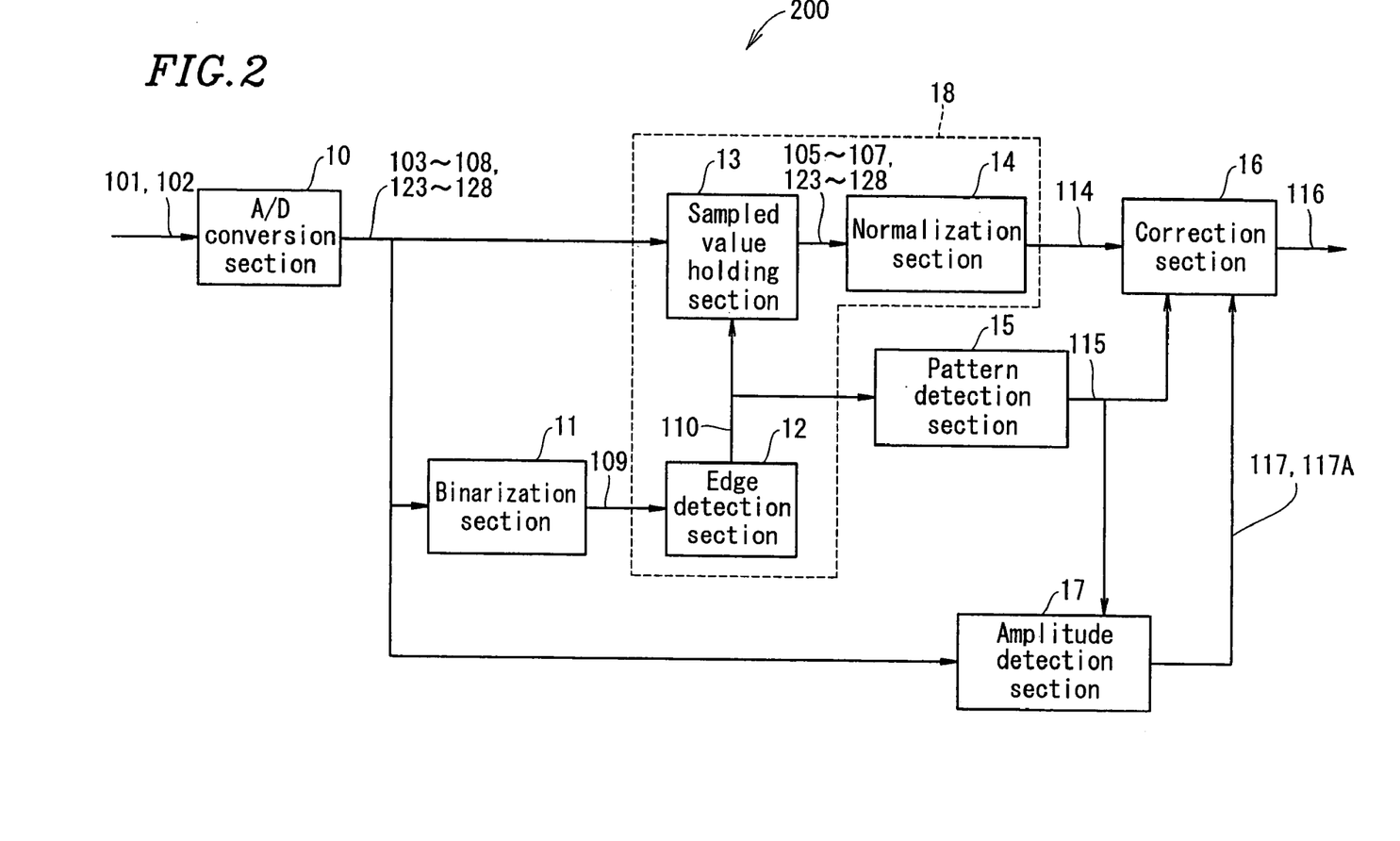
FIG. 2 is a block diagram of a jitter detection apparatus according to a second example and a third example of the present invention.

In a second example of the present invention, the correction value, which is predetermined in the first example, is changeable in accordance with the amplitude of a signal range having the shortest pattern. FIG. 2 is a block diagram illustrating a jitter detection apparatus 200 according to the second example of the present invention. The jitter detection apparatus 200 includes an amplitude detection section 17 in addition to the elements of the jitter detection apparatus 100 shown in FIG. 1.

The amplitude detection section 17 detects at least one of a plurality of multiple value digital signals sampled at the times before and after the zero-cross point, and thus obtains the amplitude of the analog signal 101 at least one of before or after the zero-cross point. In this example, the amplitude of the analog signal 101 at least one of before or after the zero-cross point is referred to as the "amplitude of the multiple value digital signal sampled at the zero-cross point". In one preferred embodiment, the sum of the absolute values of two multiple value digital signals sampled at the times before and after the zero-cross point is referred to as the "amplitude of the multiple value digital signal sampled at the zero-cross point". In another preferred embodiment, the difference between (i) the absolute value of one of the two multiple value digital signals sampled at the times before and after the zero-cross point and (ii) the prescribed threshold value 111 is referred to as the "amplitude of the multiple value digital signal sampled at the zero-cross point".

In FIG. 2, elements identical to those of the jitter detection apparatus 100 shown in FIG. 1 bear identical reference numerals thereto, and detailed descriptions thereof will be omitted.

The A/D conversion section 10 outputs the multiple value digital signals 103 through 108 and 123 through 128 to the amplitude detection section 17 in addition to the binarization section 11 and the sampled value holding section 13. The pattern detection section 15 outputs the pattern information 115 to the amplitude detection section 17 in addition to the correction section 16.

The analog signal 101 is made of continuous various signal patterns (2T, 3T, 4T, . . . ). Herein, a specific portion of the analog signal 101 over a period corresponding to one or more patterns is referred to as the "signal range".

The amplitude detection section 17 detects an amplitude of a signal range of the analog signal 101 having the shortest pattern, i.e., the 2T pattern, based on the pattern information 115 and the multiple value digital signals 103 through 108 and 123 through 128. For example, the signal range of the analog signal 120 corresponding to a period between the multiple value digital signals 124 and 127 (FIG. 4A) have the shortest pattern, i.e., 2T pattern. In this case, the sum B of the absolute value of the multiple value digital signal 124 and the absolute value of the multiple value digital signal 127 is the amplitude of the signal range having the shortest, 2T, pattern. In this example, the sum B of the absolute values is the "amplitude of the multiple value digital signal sampled at the zero-cross point".

In another preferred embodiment, a signal range of the analog signal 120 corresponding to a period between one of the multiple value digital signals 124 and 127 and the multiple value digital signal 123 may have the shortest pattern. In this case, the sum of the absolute value of one of the multiple value digital signals 124 and 127 and the absolute value of the multiple value digital signal 123 is the "amplitude of the multiple value digital signal sampled at the zero-cross point".

The amplitude detection section 17 outputs amplitude information 117 representing the amplitude of the signal range having the shortest, 2T, pattern to the correction section 16. The amplitude information 117 represents, for example, an amplitude of a signal range having the shortest pattern (2T) immediately before and/or immediately after the zero-cross point, the jitter of which is to be obtained. Alternatively, the amplitude information 117 may represent the average value of amplitudes of a plurality of signal ranges which are each included in the analog signal 101 and correspond to the shortest pattern (2T). The correction section 16 corrects the normalized jitter amount $J_N$ in accordance with the amplitude information 117, the pattern information 115 and the amplitude of the signal range of the analog signal 101 having at least the 3T pattern. In this example, the value of the amplitude of the signal range having at least the 3T pattern is predetermined, and information representing such a value of the amplitude is pre-stored in the correction section 16.

Where, for example, the correction value is β, the predetermined amplitude of the signal range having at least the 3T pattern is G, and the amplitude of the signal range having the shortest, 2T, pattern which is represented by the amplitude information 117 is I, a corrected jitter amount H is obtained based on expression (5). The calculation of expression (5) is performed by the correction section 16.

$$H = J_N \times \beta \quad \text{expression (5)}$$

The correction value β is determined in accordance with the pattern (run-length) of the binary signal 109 immediately before and immediately after the zero-cross point as follows.

When the pattern of the signals on both sides of the zero-cross point is 2T: β=I/G When the pattern of the signal on only one of both sides of the zero-cross point is 2T: β=(I/G+1)/2

When the pattern of the signals on both sides of the zero-cross point is 3T or larger: β=1.0

For example, in the case of the analog signal 120 shown in FIG. 4A ($J_N = J_2$), the pattern of the signals on both sides of the zero-cross point is 2T. Thus, the correction value of β=I/G.

In the case of an apparatus with which mediums are exchangeable, for example, an optical disc apparatus, the amplitude of the signal range having the shortest pattern is not always the same because different types of mediums may have different characteristics. The amplitude may be different even for the same type of mediums when different information is recorded thereon. For such a case where the amplitude of the signal range having the shortest pattern of the input signal is not constant, the apparatus of the second example is especially effective.

EXAMPLE 3

In a third example of the present invention, amplitude ratio information which represents the ratio between the amplitude of the signal range having the shortest pattern and the amplitude of a signal range having a pattern other than the shortest pattern is generated, and the correction value, which is predetermined in the first example, is set to be changeable in accordance with the amplitude ratio information. The third example will be described with reference to FIGS. 2, 4A and 4B.

The amplitude detection section 17 detects an amplitude of a signal range of the analog signal 101 having the shortest pattern, i.e., the 2T pattern, and an amplitude of a signal range of the analog signal 101 having a pattern other than the shortest pattern, based on the pattern information 115 and the multiple value digital signals 103 through 108 and 123 through 128. For example, the signal range of the analog signal 120 corresponding to a period between the multiple value digital signals 124 and 127 (FIG. 4A) have the shortest, i.e., 2T pattern. In this case, the sum B of the absolute value of the multiple value digital signal 124 and the absolute value of the multiple value digital signal 127 is the amplitude of the signal range having the shortest, 2T, pattern. In this example, the sum B of the absolute values is the "amplitude of the multiple value digital signal sampled at the zero-cross point".

In another preferred embodiment, a signal range of the analog signal 120 corresponding to a period between one of the multiple value digital signals 124 and 127 and the multiple value digital signal 123 may have the shortest pattern. In this case, the sum of the absolute value of one of the multiple value digital signals 124 and 127 and the absolute value of the multiple value digital signal 123 is the "amplitude of the multiple value digital signal sampled at the zero-cross point".

For example, a signal range of the analog signal 121 corresponding between the multiple value digital signal 125 and the multiple value digital signal 126 (FIG. 4B) is the signal range having a pattern other than the shortest pattern. In this example, this signal range has a 3T pattern. In this case, the sum C of the absolute value of the multiple value digital signal 125 and the absolute value of the multiple value digital signal 126 is the amplitude of the signal range having the 3T pattern. In this example, the sum C of the absolute values is the "amplitude of the multiple value digital signal sampled at the zero-cross point".

In another preferred embodiment, a signal range of the analog signal 120 corresponding to a period between one of the multiple value digital signals 125 and 126 and the multiple value digital signal 128 may have a pattern other than the shortest pattern. In this case, the sum of the absolute value of one of the multiple value digital signals 125 and 126 and the absolute value of the multiple value digital signal 128 is the "amplitude of the multiple value digital signal sampled at the zero-cross point".

The amplitude detection section 17 divides the amplitude of the signal range having the shortest pattern by the amplitude of the signal range having the pattern other than the shortest pattern to obtain the amplitude ratio. The amplitude detection section 17 then outputs amplitude ratio information 117A representing the amplitude ratio obtained by the calculation to the correction section 16. The correction section 16 corrects the normalized jitter amount $J_N$ in accordance with the pattern information 115 and the amplitude ratio information 117A.

Where, for example, the correction value is γ and the amplitude ratio represented by the amplitude ratio information 117A is K, a corrected jitter amount H is obtained based on expression (6). The calculation of expression (6) is performed by the correction section 16.

$$H = J_N \times \gamma \qquad \text{expression (6)}$$

The correction value γ is determined in accordance with the pattern (run-length) of the binary signal 109 immediately before and immediately after the zero-cross point as follows.

When the pattern of the signals on both sides of the zero-cross point is 2T: γ=K When the pattern of the signal on only one of both sides of the zero-cross point is 2T: γ=(K+1)/2

When the pattern of the signals on both sides of the zero-cross point is 3T or larger: γ=1.0

For example, in the case of the analog signal 120 shown in FIG. 4A ($J_N=J_2$), the pattern of the signals on both sides of the zero-cross point is 2T. Thus, the correction value of γ=K.

In the case of an apparatus with which mediums are exchangeable, for example, an optical disc apparatus, reproduction signals having the same pattern do not always have the same amplitude, because different types of mediums may have different reflectances. Conventionally, the analog signal 101 is obtained by performing pre-processing of increasing or decreasing the amplitude of the reproduction signal such that the amplitude of the reproduction signal is constant. In the third example, a correct jitter amount can be detected without such pre-processing.

In the first through third examples, a normalized jitter amount is obtained using three multiple value digital signals, i.e., a multiple value digital signal sampled at the zero-cross point, a multiple value digital signal sampled immediately before the zero-cross point, and a multiple value digital signal sampled immediately after the zero-cross point. Alternatively, a normalized jitter amount may be obtained using two multiple value digital signals, i.e., a multiple value digital signal sampled at the zero-cross point, and either a multiple value digital signal sampled immediately before the zero-cross point or a multiple value digital signal sampled immediately after the zero-cross point.

In this case, each time the edge signal 110 becomes HIGH, the sampled value holding section 13 holds (i) a multiple value digital signal sampled at the zero-cross point, and (ii) one of a multiple value digital signal sampled immediately before the zero-cross point and a multiple value digital signal sampled immediately after the zero-cross point, which has a different polarity from that of the multiple value digital signal sampled at the zero-cross point. The sampled value holding section 13 may output, to the pattern detection section 15, before/after information which represents which multiple value digital signal is held among the multiple value digital signal sampled immediately before the zero-cross point and the multiple value digital signal sampled immediately after the zero-cross point.

For example, the sampled value holding section 13 holds (i) the multiple value digital signal 106 sampled at the zero-cross point corresponding to the HIGH level period 112, and (ii) one of the multiple value digital signal 105 sampled immediately before the zero-cross point and the multiple value digital signal 107 sampled immediately after the zero-cross point, which has a different polarity from that of the multiple value digital signal 106. In this example, the multiple value digital signal 106 and the multiple value digital signal 105, which has a different polarity from that of the multiple value digital signal 106, are held by the sampled value holding section 13.

The normalization section 14 obtains a normalized jitter amount by dividing the absolute value of the multiple value digital signal sampled at the zero-cross point by a prescribed absolute value. The prescribed absolute value is the sum of (i) the absolute value of the multiple value digital signal sampled at the zero-cross point and (ii) the absolute value of one of the multiple value digital signal sampled immediately before the zero-cross point and the multiple value digital signal sampled immediately after the zero-cross point, which has a different polarity from that of the multiple value digital signal sampled at the zero-cross point. The normalization section 14 outputs normalized jitter data 114 representing the obtained normalized jitter amount to the correction section 16.

For example, the normalized jitter amount corresponding to the HIGH level period 112 is obtained by dividing the absolute value of the multiple value digital signal 106 by the sum of the absolute value of the multiple value digital signal 105 and the absolute value of the multiple value digital signal 106. The pattern detection section 15 outputs the pattern information 115 representing one of the pattern before the zero-cross point or the pattern after the zero-cross point, which is indicated by the before/after information from the sampled value holding section 13. The pattern information 115 is output to the correction section 16.

The correction section 16 uses the correction value α, β or γ described above for correcting the normalized jitter amount. The correction values α, β and γ change in accordance with whether the pattern of the signals on both sides of the zero-cross point is 2T, the pattern of the signal on only one of both sides of the zero-cross point is 2T, or the pattern of the signals on both sides of the zero-cross point is 3T or larger.

EXAMPLE 4

Figure 6:
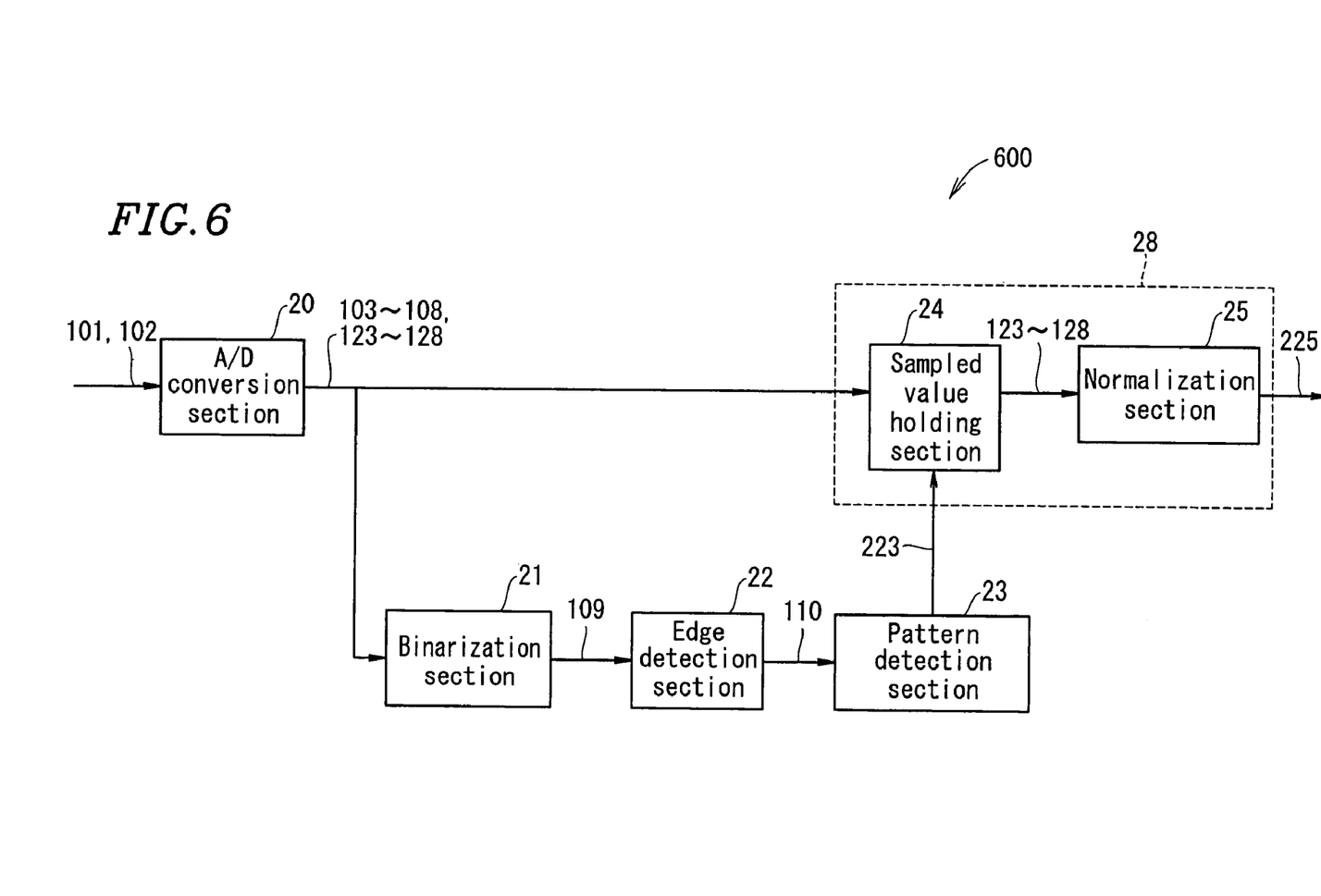
FIG. 6 is a block diagram of a jitter detection apparatus according to the fourth example of the present invention.

FIG. 6 is a block diagram illustrating a jitter detection apparatus 600 according to a fourth example of the present invention.

The jitter detection apparatus 600 includes an A/D conversion section 20 for converting an input analog signal into a plurality of discrete multiple value digital signals, a binarization section 21 for performing binarization of the plurality of discrete multiple value digital signals to generate a binary signal, an edge detection section 22, a pattern detection section 23 for detecting patterns of the binary signal before and after the time when the value of the binary signal is changed, and a jitter calculation section 28 for calculating a jitter amount based on (i) an error between the value of a prescribed multiple value digital signal sampled at a time which is substantially the same as the above-mentioned time and a prescribed threshold value, and (ii) the detected pattern. The jitter calculation section 28 includes a sampled value holding section 24 and a normalization section 25.

With reference to FIGS. 3 and 6, the A/D conversion section 20 receives an analog signal 101 and a sampling clock signal 102 phase-synchronized to the analog signal 101 from an optical head section, a PLL, or the like (not shown). The A/D conversion section 20 converts the analog signal 101 into a plurality of discrete multiple value digital signals 103, 104, 105, 106, 107 and 108 based on a prescribed threshold value 111 at every clock cycle of the sampling clock signal 102. Then, the A/D conversion section 20 outputs the multiple value digital signals 103 through 108 to the binarization section 21 and the sampled value holding section 24.

The binarization section 21 performs binarization of the multiple value digital signals 103 through 108 received from the A/D conversion section 20 to generate a binary signal 109. The binarization section 21 then outputs the binary signal 109 to the edge detection section 22. As the binarization method, any conventional method is usable. For example, the binarization is performed based on the polarity of the sum of the values of the continuous digital signals.

The edge detection section 22 detects a time at which the value of the binary signal 109 is changed, and generates an edge signal 110 which becomes HIGH at the time when the value of the binary signal 109 is changed. The time when the value of the binary signal 109 is changed matches the time when the value of the sampling clock signal 102 is changed. The edge detection section 22 outputs the edge signal 110 to the pattern detection section 23.

The pattern detection section 23 detects the intervals between the time when the edge signal 110 becomes HIGH and the immediately previous time when the edge signal 110 becomes HIGH and the immediately subsequent time when the edge signal 110 becomes HIGH, on a cycle-by-cycle basis of the sampling clock signal 102. The pattern detection section 23 then outputs a selection signal 223 to the sampled value holding section 24. The selection signal 223 represents which is longer among the interval between the time when the edge signal 110 becomes HIGH and the immediately previous time when the edge signal 110 becomes HIGH, and the interval between the time when the edge signal 110 becomes HIGH and the immediately subsequent time when the edge signal 110 becomes HIGH. For example, the pattern immediately before the HIGH level period 112 is 3T and the pattern immediately after the HIGH level period 112 is 2T. As such, the selection signal 223 indicates that the interval immediately before the HIGH level period 112 is longer than the interval immediately after the HIGH level period 112.

Each time the edge signal 110 becomes HIGH, the sampled value holding section 24 holds (i) a multiple value digital signal sampled at the zero-cross point and (ii) one of a multiple value digital signal sampled immediately before the zero-cross point and a multiple value digital signal sampled immediately after the zero-cross point, whichever belongs to the longer interval (represented by the selection signal 223). The sampled value holding section 24 then outputs the held multiple value digital signals to the normalization section 25.

For example, based on the selection signal 223, the sampled value holding section 24 holds (i) either the multiple value digital signal 105 sampled immediately before the zero-cross point corresponding to the HIGH level period 112 and the multiple value digital signal 107 sampled immediately after the zero-cross point corresponding to the HIGH level period 112, which belongs to a longer interval and (ii) the multiple value digital signal 106 sampled at the zero-cross point. In this example, the multiple value digital signal 105 belongs to the longer interval (3T pattern in this example) than the multiple value digital signal 107. Therefore, the sampled value holding section 24 holds the multiple value digital signal 105 and the multiple value digital signal 106.

The normalization section 25 divides the absolute value of the multiple value digital signal sampled at the zero-cross point by a prescribed absolute value to obtain a normalized jitter data amount. The normalization section 25 outputs normalized jitter data 225 representing the normalized jitter amount. The prescribed absolute value is the absolute value of the multiple value digital signal belonging to the longer interval (represented by the selection signal 223) among the multiple value digital signal sampled immediately before the zero-cross point and the multiple value digital signal sampled immediately after the zero-cross point.

For example, the normalized jitter amount corresponding, to the HIGH level period 112 is obtained by dividing the absolute value of the multiple value digital signal 106 by the absolute value of the multiple value digital signal 105.

When the patterns before and after the zero-cross point are equal in length to each other, the sampled value holding section 24 holds the multiple value digital signal having a different polarity from that of the multiple value digital signal sampled at the zero-cross point, among the multiple value digital signals sampled immediately before and immediately after the zero-cross point.

Alternatively, patterns of a certain length or longer may be treated as patterns of the same length. For example, all the patterns of 4T or longer may be treated as 4T patterns.

In the case where the patterns before and after the zero-cross point are both 2T, the correction described in the first through third examples may be performed. In such a case, a more correct jitter amount can be obtained.

In the above-described examples, multiple value digital signals are sampled at a time having a phase difference of 0 degrees with respect to the zero-cross point. The present invention is applicable to a jitter detection method by which multiple value digital signals are sampled at a time having a phase difference of 180 degrees with respect to the zero-cross point. In this case, the value of a multiple value digital signal at the zero-cross point is obtained by performing linear interpolation using the multiple value digital signals at two points before and after the zero-cross point. The jitter amount is corrected in accordance with the patterns before and after the zero-cross point. In this manner, a more correct jitter amount can be obtained.

According to a jitter detection apparatus and a jitter detection method of the present invention, a correct jitter amount can be obtained even when a signal having a large inter-symbol interference is reproduced in a reproduction operation using a digital read channel technology. The present invention is especially useful for, for example, reproducing a signal modulated using a modulation system by which the minimum run-length is set as a 2-clock cycle.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A jitter detection apparatus, comprising:
    an A/D conversion section for converting an input analog signal into a plurality of discrete multiple value digital signals;
    a binarization section for performing binarization of the plurality of multiple value digital signals to generate a binary signal;
    a jitter calculation section for calculating a jitter amount based on an error between a value of a prescribed multiple value digital signal sampled at a time which is substantially the same as a time when the value of the binary signal is changed and a prescribed threshold value;
    a pattern detection section for detecting patterns of the binary signal before and after the time when the prescribed multiple value digital signal is sampled; and
    a correction section for correcting the jitter amount based on the detected pattern.

2. A jitter detection apparatus according to claim 1, wherein the correction section corrects the jitter amount when the detected pattern includes a shortest pattern.

3. A jitter detection apparatus according to claim 2, wherein:
    the input analog signal is modulated based on a run-length limited code having a shortest run-length of 2 clock cycles, and
    the length of the shortest pattern is a length of 2 clock cycles.

4. A jitter detection apparatus, comprising:
    an A/D conversion section for converting an input analog signal into a plurality of discrete multiple value digital signals;
    a binarization section for performing binarization of the plurality of multiple value digital signals to generate a binary signal;
    a jitter calculation section for calculating a jitter amount based on an error between a value of a prescribed multiple value digital signal sampled at a time which is substantially the same as a time when the value of the binary signal is changed and a prescribed threshold value;
    a pattern detection section for detecting patterns of the binary signal before and after the time when the prescribed multiple value digital signal is sampled;
    an amplitude detection section for detecting an amplitude of the prescribed multiple value digital signal based on at least one of a plurality of multiple value digital signals sampled before and after the time when the prescribed multiple value digital signal is sampled; and
    a correction section for correcting the jitter amount based on the detected pattern and the detected amplitude.

5. A jitter detection apparatus according to claim 4, wherein the amplitude detection section detects an amplitude of a range of the input analog signal having a shortest pattern, based on at least one of the sampled plurality of multiple value digital signals.

6. A jitter detection apparatus according to claim 5, wherein the amplitude detection section further detects an amplitude of a range of the input analog signal having a pattern other than the shortest pattern.

7. A jitter detection apparatus according to claim 4, wherein the correction section corrects the jitter amount when the detected pattern includes a shortest pattern.

8. A jitter detection apparatus according to claim 7, wherein:
    the input analog signal is modulated based on a run-length limited code having a shortest run-length of 2 clock cycles, and
    the length of the shortest pattern is a length of 2 clock cycles.

9. A jitter detection apparatus, comprising:
    an A/D conversion section for converting an input analog signal into a plurality of discrete multiple value digital signals;

a binarization section for performing binarization of the plurality of multiple value digital signals to generate a binary signal;

a pattern detection section for detecting patterns of the binary signal before and after a time when the value of the binary signal is changed; and a jitter calculation section for calculating a jitter amount based on the detected pattern and an error between a prescribed threshold value and a value of a prescribed multiple value digital signal sampled at a time which is substantially the same as the time when the value of the binary signal is changed.

10. A jitter detection apparatus according to claim 9, wherein the jitter calculation section calculates the jitter amount based on a pattern which is longer among the pattern of the binary signal before the time when the prescribed multiple value digital signal is sampled and the pattern of the binary signal after the time when the prescribed multiple value digital signal is sampled.

11. A jitter detection apparatus according to claim 9, wherein the input analog signal is modulated based on a run-length limited code having a shortest run-length of 2 clock cycles.

12. A jitter detection method, comprising the steps of:
converting an input analog signal into a plurality of discrete multiple value digital signals;

performing binarization of the plurality of multiple value digital signals to generate a binary signal;

calculating a jitter amount based on an error between a value of a prescribed multiple value digital signal sampled at a time which is substantially the same as a time when the value of the binary signal is changed and a prescribed threshold value;

detecting patterns of the binary signal before and after the time when the prescribed multiple value digital signal is sampled; and correcting the jitter amount based on the detected pattern.

13. A jitter detection method, comprising the steps of:
converting an input analog signal into a plurality of discrete multiple value digital signals;

performing binarization of the plurality of multiple value digital signals to generate a binary signal;

calculating a jitter amount based on an error between a value of a prescribed multiple value digital signal sampled at a time which is substantially the same as a time when the value of the binary signal is changed and a prescribed threshold value;

detecting patterns of the binary signal before and after the time when the prescribed multiple value digital signal is sampled;

detecting an amplitude of the prescribed multiple value digital signal based on at least one of a plurality of multiple value digital signals sampled before and after the time when the prescribed multiple value digital signal is sampled; and correcting the jitter amount based on the detected pattern and the detected amplitude.

14. A jitter detection method, comprising the steps of:
converting an input analog signal into a plurality of discrete multiple value digital signals;

performing binarization of the plurality of multiple value digital signals to generate a binary signal;

detecting patterns of the binary signal before and after a time when the value of the binary signal is changed; and calculating a jitter amount based on the detected pattern and an error between a prescribed threshold value and a value of a prescribed multiple value digital signal sampled at a time which is substantially the same as the time when the value of the binary signal is changed.

* * * * *